United States Patent
Batchelder et al.

(10) Patent No.: US 11,654,624 B2
(45) Date of Patent: May 23, 2023

(54) BUILDING LAYERS WITH UNSUPPORTED PORTIONS THROUGH SELECTIVE DEPOSITION-BASED ADDITIVE MANUFACTURING

(71) Applicant: Evolve Additive Solutions, Inc., Minnetonka, MN (US)

(72) Inventors: J. Samuel Batchelder, Somers, NY (US); Arun Chowdry, Maple Grove, MN (US); Chris Anton, Rosemount, MN (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 247 days.

(21) Appl. No.: 16/958,909

(22) PCT Filed: Dec. 28, 2018

(86) PCT No.: PCT/US2018/067920
§ 371 (c)(1),
(2) Date: Jun. 29, 2020

(87) PCT Pub. No.: WO2019/133846
PCT Pub. Date: Jul. 4, 2019

(65) Prior Publication Data
US 2020/0338815 A1    Oct. 29, 2020

Related U.S. Application Data

(60) Provisional application No. 62/612,066, filed on Dec. 29, 2017.

(51) Int. Cl.
*B29C 64/218*   (2017.01)
*B29C 64/147*   (2017.01)
(Continued)

(52) U.S. Cl.
CPC .......... *B29C 64/218* (2017.08); *B29C 64/147* (2017.08); *B29C 64/153* (2017.08);
(Continued)

(58) Field of Classification Search
CPC ... B29C 64/147; B29C 64/364; B29C 64/153; B29C 64/40; B29C 64/218; B33Y 10/00; B33Y 30/00
(Continued)

(56) References Cited

U.S. PATENT DOCUMENTS 5,192,559 A    3/1993   Hull et al.
8,488,994 B2   7/2013   Hanson et al.
(Continued)

FOREIGN PATENT DOCUMENTS

WO   2016084348   6/2016
WO   2019133846   7/2019

OTHER PUBLICATIONS

"International Preliminary Reporton Patentability," for PCT Application No. PCT/US2018/067920 dated Jul. 9, 2020 (12 pages).
(Continued)

*Primary Examiner* — Matthew J Daniels
*Assistant Examiner* — Gregory C. Grosso
(74) *Attorney, Agent, or Firm* — Pauly, DeVries Smith & Deffner LLC (57) ABSTRACT

A method of selective deposition-based additive manufacturing includes conveying a layer (28) of material to previously built layers (22) of material. A determination is made as to whether at least one of the conveyed layers (28) of material and a top previously built layer (22) of material
(Continued)

contains an unsupported portion (302). When at least one of the conveyed layer (28) of material and the top previously built layer (22) of material contains an unsupported portion, a first set of steps (306, 408, 506) are used to transfer the conveyed layer (28) of material to the top previously built layer (22) of material. When neither of the conveyed layer (28) of material and the top previously built layer (22) of material contains an unsupported portion, a second set of steps (304, 406, 504) are used to transfer the conveyed layer (28) of material to the top previously built layer (22) of material.

12 Claims, 8 Drawing Sheets

(51) Int. Cl.
| | |
|---|---|
| *B29C 64/364* | (2017.01) |
| *B29C 64/153* | (2017.01) |
| *B29C 64/40* | (2017.01) |
| *B33Y 10/00* | (2015.01) |
| *B33Y 30/00* | (2015.01) |
| *B22F 12/63* | (2021.01) |
| *B22F 10/40* | (2021.01) |

(52) U.S. Cl.
CPC .......... *B29C 64/364* (2017.08); *B29C 64/40* (2017.08); *B22F 10/40* (2021.01); *B22F 12/63* (2021.01); *B33Y 10/00* (2014.12); *B33Y 30/00* (2014.12)

(58) Field of Classification Search
USPC .......................................................... 156/60
See application file for complete search history.

(56) References Cited

U.S. PATENT DOCUMENTS

| | | | |
|---|---|---|---|
| 8,879,957 | B2 | 11/2014 | Hanson et al. |
| 2013/0186558 | A1 | 7/2013 | Comb et al. |
| 2014/0328963 | A1* | 11/2014 | Mark ................ B33Y 50/02 425/143 |
| 2015/0266237 | A1* | 9/2015 | Comb ................ B29C 64/153 264/401 |
| 2017/0192377 | A1 | 7/2017 | Batchelder et al. |
| 2017/0299973 | A1 | 10/2017 | Frauens |

OTHER PUBLICATIONS

"International Search Report and Written Opinion," for PCT Application No. PCT/US2018/067920 dated Jul. 16, 2019 (20 pages).

* cited by examiner

BUILDING LAYERS WITH UNSUPPORTED PORTIONS THROUGH SELECTIVE DEPOSITION-BASED ADDITIVE MANUFACTURING

BACKGROUND

The present disclosure relates to additive manufacturing systems for building three-dimensional (3D) parts and support structures. In particular, the present disclosure relates to additive manufacturing systems and processes for building 3D parts and support structures using an imaging process, such as electrostatography in a selective deposition-based additive manufacturing system.

Additive manufacturing is generally a process for manufacturing a three-dimensional (3D) object in additive manner utilizing a computer model of the objects. The basic operation of an additive manufacturing system consists of slicing a three-dimensional computer model into thin cross sections, translating the result into position data, and the position data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In an electrostatographic 3D printing process, slices of the digital representation of the 3D part and its support structure are printed or developed using an electrophotographic engine. The electrostatographic engine generally operates in accordance with 2D electrophotographic printing processes, using charged powder materials that are formulated for use in building a 3D part (e.g., a polymeric toner material). The electrostatographic engine typically uses a support drum that is coated with a photoconductive material layer, where latent electrostatic images are formed by electrostatic charging following image-wise exposure of the photoconductive layer by an optical source. The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and pressure to build the 3D part.

In addition to the aforementioned commercially available additive manufacturing techniques, a novel additive manufacturing technique has emerged, where particles are first selectively deposited in an imaging process, forming a layer corresponding to a slice of the part to be made; the layers are then bonded to each other, forming a part. This is a selective deposition process, in contrast to, for example, selective sintering, where the imaging and part formation happens simultaneously. The imaging step in a selective deposition process can be done using electrophotography. In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

A method of additive manufacturing utilizing electrostatography in a selective deposition-based additive manufacturing system includes conveying a layer of material to previously built layers of material. A determination is made as to whether at least one of the conveyed layer of material and a top previously built layer of material contains an unsupported portion. When at least one of the conveyed layer of material and the top previously built layer of material contains an unsupported portion, a first set of steps are used to transfer the conveyed layer of material to the top previously built layer of material. When neither of the conveyed layer of material and the top previously built layer of material contains an unsupported portion, a second set of steps are used to transfer the conveyed layer of material to the top previously built layer of material.

A selective deposition-based additive manufacturing system includes a build platform holding previously built layers of material and a conveyor, conveying a next layer of material. A controller in the system determines that either a top previously built layer or the next layer contains an unsupported portion. Based on that determination, the controller alters the transfer of the next layer onto the top previously built layer so that the transfer is different from a transfer when neither the next layer nor the top previously built layer contains an unsupported portion.

In a still further embodiment, a selective deposition-based additive manufacturing system includes a conveyor for conveying a layer of material to previously built layers of material and a belt-to-part transfer assembly. The belt-to-part transfer assembly controls the temperature of layers of material to transfer the conveyed layer of material to the previously built layers of material without destroying unsupported portions in any of the layers of material.

Definitions

Unless otherwise specified, the following terms as used herein have the meanings provided below:

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "selective deposition" refers to an additive manufacturing technique where one or more layers of particles are fused to previously deposited layers utilizing heat and pressure over time where the particles fuse together to form a layer of the part and also fuse to the previously printed layer.

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

Figure 1A:
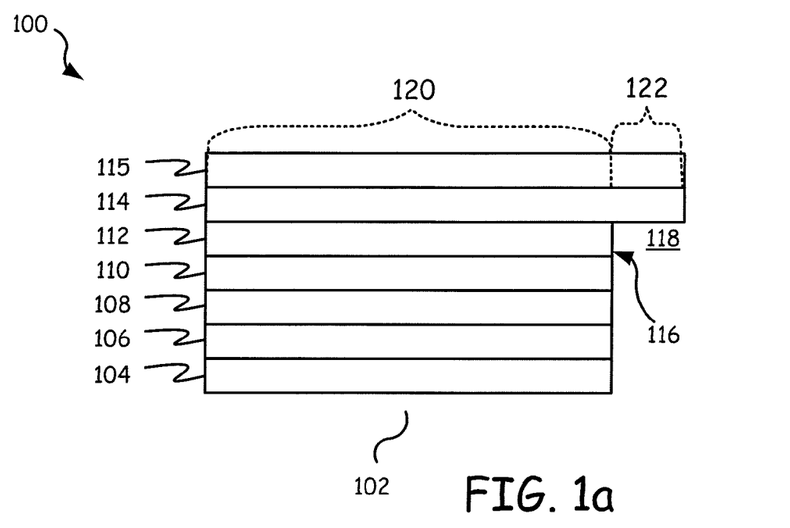
FIG. 1a is a side sectional view of a part built through selective deposition-based additive manufacturing in accordance with one embodiment.

FIG. 1a shows a side view of a part 100 formed through selective deposition-based additive manufacturing in accordance with one embodiment. Part 100 includes a block of material 102 produced by transferring a series of part layers 104, 106, 108, 110 and 112 on top of each other. Each of the part layers in block 102 has a shared edge 116. Part 100 also includes a shelf layer 114 that has been transferred on top of block 102 and cover layer 115 that has been transferred on top of shelf layer 114. Shelf layer 114 includes a supported portion 120 and a shelf or unsupported portion 122 that extends over an empty space 118 that is past shared edge 116. As a result, shelf portion 122 does not have any part or support material directly below it. As illustrated, a part 100 is printed of a single material for purposes of simplification. However, a structure containing both part material and support material is typically printed where the shelf or unsupported portion can be either the part or the support structure for the part.

Figure 1B:
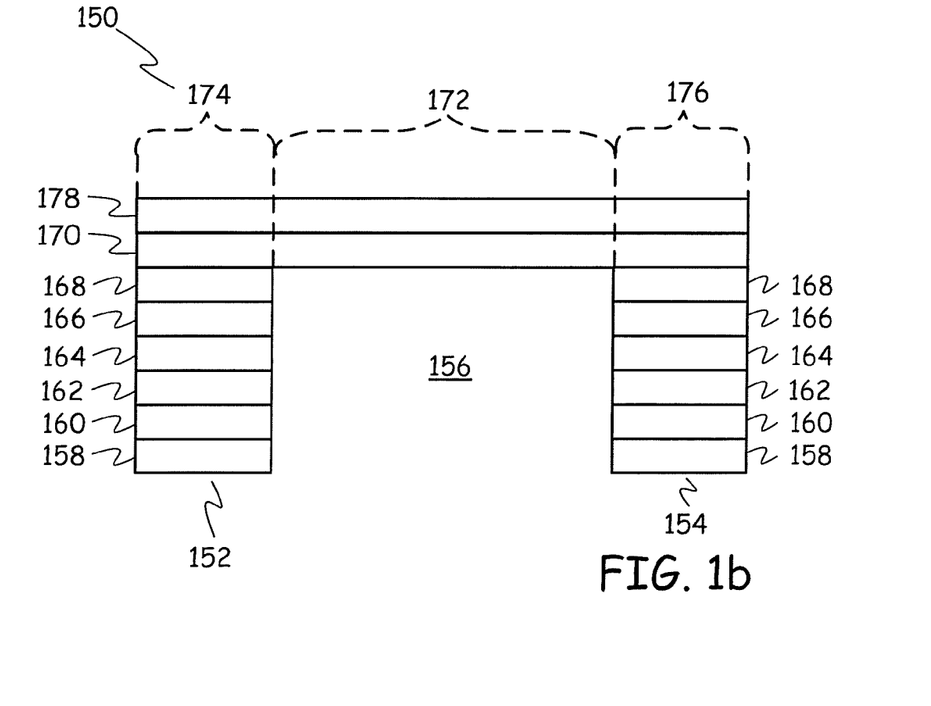
FIG. 1b is a side sectional view of a second part built through selective deposition-based additive manufacturing in accordance with a further embodiment.

FIG. 1b shows a side view of a part 150 formed through selective deposition-based additive manufacturing in accordance with one embodiment. Part 150 includes two pillars 152 and 154 that are separated by a space 156. Space 156 does not include any material. Pillars 152 and 154 are formed by transferring successive layers of material on top of previously transferred layers. To construct the pillars, each transferred layer includes an area of material for pillar 152, an area of no material for space 156 and an area of material for pillar 154. Thus, pillars 152 and 154 are formed through the successive transfer of layers 158, 160, 162, 164, 166 and 168 with layer 158 being transferred first and layer 168 being transferred last. FIG. 1b also shows a bridging layer 170 that includes a bridge or unsupported portion 172 and supported portions 174 and 176. Bridge portion 172 extends over space 156 and supported portions 174 and 176 are transferred onto pillars 152 and 154. A covering layer 178 is shown as transferred over bridge layer 170 and is supported by the entirety of bridge layer 170 in FIG. 1b. As illustrated, a part 150 is printed of a single material for purposes of simplification. However, a structure 150 containing both part material and support material is typically printed where the bridge or unsupported portion 172 can be either the part or the support structure for the part.

To date, it has not been possible to print an entire part layer of toner material utilizing electrostatography based additive manufacturing separate from previously built layers and then transfer the newly printed part layer onto the previously built layers so as to construct an unsupported portion over any significant space. The present inventors have identified several possible causes for these failures.

First, because there is no material in the space, there is no material in the previously built layers to grab the unsupported portion from the conveyor and as a result, the unsupported portion does not transfer properly from the conveyor. Instead, the unsupported portion fails to transfer to the part creating feature omissions in the layer.

Second, after a layer is transferred onto previously built layers of a part, an air knife is applied to the transferred layer to cool the layer. This air knife applies an airstream to the transferred layer that strikes the transferred layer at an impingement area and then flows along the surface of the transferred layer. At the impingement area, the airstream applies a downward force on the transferred layer. Where the airstream flows tangentially across the surface of the transferred layer, a low-pressure area is created above the transferred layer. For unsupported portions, the downward pressure caused by the impingement of the air stream tends to bend the unsupported portion downward and the low pressure areas where the airstream flows tangentially tend to bend the unsupported portion upward. As a result of these different forces, the unsupported portions can become disfigured and in some cases layers containing unsupported portions lift away from the previously built layers.

Lastly, before cover layers, such as cover layer 115 and cover layer 178, can be applied to a layer containing an unsupported portion, such as shelf layer 114 and bridge layer 170, the layer containing the unsupported portion must be heated. Although the same amount of heat is applied to the unsupported portions and the supported portions of such layers, the present inventors have found that the temperatures of the unsupported portions greatly exceed the temperatures of the supported portions. The reason for this is that the airspace under the unsupported portions has a greater thermal resistance than block 102 causing more of the applied heat to remain in the unsupported portions than in the supported portions. The temperature of the unsupported portions increases until the unsupported portion loses its mechanical integrity and collapses.

Having discovered these problems, the present inventors have also discovered techniques for overcoming the problems that can be used alone or in combination with each other.

While the present disclosure can be utilized with any selective deposition-based additive manufacturing system, including an electrostatography-based additive manufacturing system, the present disclosure will be described in association in an electrophotography-based (EP) additive manufacturing system. However, the present disclosure is not limited to an EP based additive manufacturing system and can be utilized with any electrostatography-based additive manufacturing system.

Figure 2:
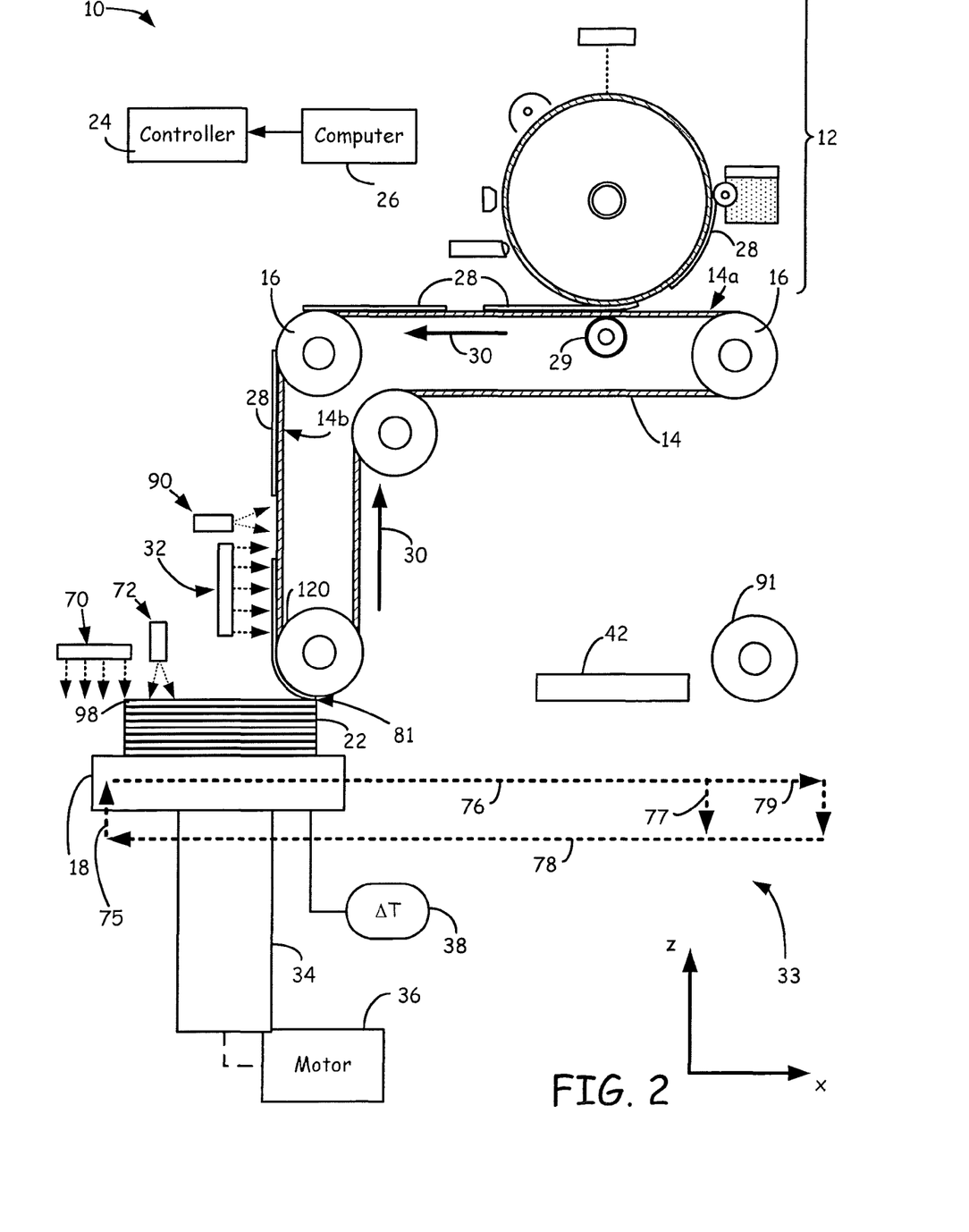
FIG. 2 is a schematic diagram of a selective deposition-based additive manufacturing system in accordance with one embodiment.

FIG. 2 provides a schematic diagram of an exemplary additive manufacturing system 10 for printing 3D parts and support structures in accordance with various embodiments. System 10 uses electrophotography to print successive layers of the 3D part and support structure and provides several elements that allow a layer to form an unsupported portion over an empty space.

In the shown embodiment, system 10 includes EP engine 12, a conveyor consisting of transfer belt 14 and rollers 16, a build platform 18, a gantry 34, and belt-to-part transfer assembly 33 for printing 3D parts (e.g., 3D part 22) and any associated support structures (not shown). Examples of suitable components and functional operations for system 10 include those disclosed in U.S. Pat. Nos. 8,879,957 and 8,488,994.

In alternative embodiments, system 10 may include different imaging engines for imaging the layers. As discussed below, the partially unsupported layer transfer technique focuses on the transfer of part layers from belt 14 (or other transfer medium) to build platform 18 (or to the 3D part 22 being printed on build platform 18) to form unsupported portions on 3D part 22, rather than focusing on the particular imaging engine. However, the layer transfer technique is particularly suitable for use with electrophotography-based additive manufacturing systems (e.g., system 10).

System 10 also includes controller 24, which is one or more control circuits, microprocessor-based engine control systems, and/or digitally-controlled imaging processor systems, and which is configured to operate the components of system 10 in a synchronized manner based on printing instructions received from host computer 26. Host computer 26 is one or more computer-based systems configured to communicate with controller 24 to provide the print instructions (and other operating information). For example, host computer 26 may transfer information to controller 24 that relates to the sliced layers of 3D part 22 (and any support structures), thereby allowing system 10 to print 3D part 22 in a layer-by-layer manner. Further, host computer 26 may transfer information identifying which layers contain unsupported portions and therefore need to be processed differently from other layers.

The imaged layers 28 of the thermoplastic-based powder are then rotated to a first transfer region in which layers 28 are transferred from EP engine 12 to belt 14. Belt 14 is an example transfer medium or conveyor for transferring or otherwise conveying the imaged layers 28 from EP engine 12 to build platform 18 with the assistance of transfer roller 120. In the shown embodiment, belt 14 includes front or transfer surface 14a and rear or contact surface 14b, where front surface 14a faces EP engine 12. As discussed below, in some embodiments, belt 14 may be a multiple-layer belt with a low-surface-energy film that defines front surface 14a, and which is disposed over a base portion that defines rear surface 14b.

System 10 may also include biasing mechanism 29, which is configured to induce an electrical potential through belt 14 to electrostatically attract part layers 28 of the thermoplastic-based powder from EP engine 12 to belt 14.

Rollers 16 are a series of drive and/or idler rollers or pulleys that are configured to maintain tension on belt 14 while belt 14 rotates in the rotational direction of arrows 30. System 10 may also include service loops (not shown), such as those disclosed in U.S. Pat. No. 8,488,994.

Belt 14 conveys successive layers 28 from EP engine 12 to belt-to-part transfer assembly 33, which transfers each part layer onto previously transferred layers of part 22 in a layer-by-layer manner Belt-to-part transfer assembly 33 optionally includes a selective fusing heater 90, a layer transfer heater 32, a uniform part transfer heater 70, a selective part transfer heater 72, a nip or transfer roller 120, an air knife or air tunnel 42 and a cooling roller 91. However, other configurations of belt-to-part transfer assembly 33 are also contemplated.

In the various embodiments, imaged layers 28 are divided into two different types of layers: partially-unsupported layers containing unsupported portions and fully-supported layers. A partially-unsupported layer includes at least one unsupported portion that will extend over an empty space from part 22 such as space 118 of FIG. 1 and space 156 of FIG. 2. Fully-supported layers do not include any unsupported portions. To better understand the embodiments that allow a partially-unsupported layer to be successfully transferred onto part 22, the transfer of a fully-supported layer onto a previously transferred fully-supported layer is discussed first.

Transfer of a fully-supported layer 28 onto a previously transferred fully-supported layer 98 begins by heating the fully-supported layer 28 on belt 14 to near an intended transfer temperature using layer transfer heater 32 prior to reaching transfer roller 120. Examples of suitable devices for heater 32 include non-contact radiant heaters (e.g., infrared heaters or microwave heaters), convection heating devices (e.g., heated air blowers), contact heating devices (e.g., heated rollers and/or platens), combinations thereof, and the like, where non-contact radiant heaters are preferred. Each layer 28 desirably passes by (or through) heater 32 for a sufficient residence time to heat the layer 28 to the intended transfer temperature.

Additionally, platen gantry 34 moves build platform 18 along the positive z-axis in the direction of arrow 75 and then, along, or through uniform part transfer heater 70 in the positive x direction of arrow 76. Gantry 34 is operated by a motor 36 based on commands from controller 24, where motor 36 may be an electrical motor, a hydraulic system, a pneumatic system, or the like. In the shown embodiments, build platform 18 is heatable with heating element 38 (e.g., an electric heater). Heating element 38 is configured to heat and maintain build platform 18 at an elevated temperature that is greater than room temperature (25° C.), such as at the desired average part temperature of 3D part 22. This allows build platform 18 to assist in maintaining 3D part 22 at this average part temperature.

In further embodiments, the temperature of build platform 18 is the bulk temperature (near $T_g$, or 120 degrees Celsius for ABS) within about 100 mils of the build plane. As the part grows in Z, the build platform temperature drops linearly with Z, generating a constant low thermal gradient and heat flow in Z, at roughly 18 degrees Celsius/inch. This reduces the risk of narrow vertical structures (posts and beams) becoming unstable. The gentle cooling rate is not sufficient to create substantial curl, but is sufficient to make tall parts mechanically robust.

Heater 70 heats the top surface of previously transferred fully-supported layer 98 to an elevated temperature, such as at the same transfer temperature as heated layer 28 (or other suitable elevated temperature). Examples of suitable devices for uniform part transfer heater 70 include non-contact radiant heaters (e.g., infrared heaters or microwave heaters), convection heating devices (e.g., heated air blowers), contact heating devices (e.g., heated rollers and/or platens), combinations thereof, and the like, where non-contact radiant heaters are preferred. For some fully-supported layers 98, heater 70 causes the temperature along edges of fully-supported layer 98 to be higher than other portions of fully-supported layer 98. In some embodiments, a modest flow of air is applied to fully-supported layers 98 after heater 70 to reduce the temperature differential across fully-supported layers 98. In particular, such a flow of air creates an air shear boundary layer that is compressed at the edges of fully-supported layer 98 causing greater cooling at the edges and thereby reducing the temperature differential across fully-supported layer 98.

Belt 14 then moves the heated layer 28 to a predetermined registration location 81, as shown. The z position of build platform 18 established by moving the build platform 18 in the positive z direction of arrow 75 causes a pressure to be applied to heated layer 28 as belt 14 moves heated layer 28 between transfer roller 120 and build platform 18 or part 22. The pressure on heated layer 28 is desirably high enough to transfer heated layer 28 to the previously-transferred layer 98 of part 22 (or to build platform 18). However, the pressure is also desirably balanced to prevent compressing 3D part 22 too much, thereby allowing 3D part 22 to maintain its dimensional integrity.

While build platform 18 remains engaged with belt 14, gantry 34 moves build platform 18 (and 3D part 22) along the x-axis in the direction of arrow 76, at a rate that is synchronized with the rotational rate of belt 14 in the direction of belt 14 at the bottom of transfer roller 120. This presses belt 14 and the heated layer 28 between the top layer 98 of 3D part 22 and transfer roller 120. Due to the heat and pressure, pressed layer 28 separates and disengages from belt 14 and transfers to top layer 98 of 3D part 22 at transfer roller 120.

Gantry 34 then moves transferred layer 28 past air knife or air tunnel 42, which applies an air flow across the top exposed surface of the transferred layers to cool part 22. Gantry 34 then drops build platform 18 down along path 77, before moving build platform 18 in the negative x direction along path 78. The process is then repeated for the next fully-supported layer or one or more of the processes described below are performed for a partially-supported layer.

Figure 3:
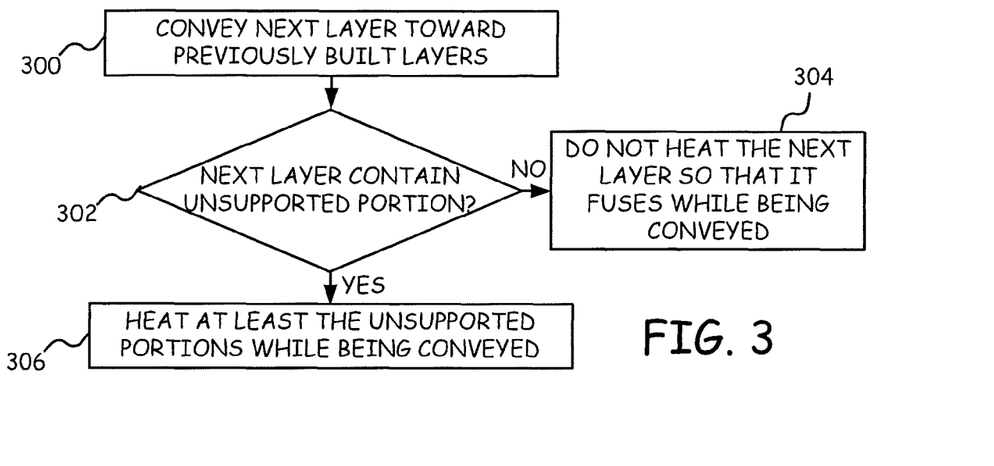
FIG. 3 is a flow diagram of a method for forming a shelf using additive manufacturing.

As noted above, one problem with attempting to transfer a partially-supported layer 28 onto part 22 is that the partially-supported portion does not have a surface to adhere to. This creates two obstacles to forming unsupported portions using a transfer roller. First, it is difficult to construct the unsupported portion if a free edge of the unsupported portion is to be transferred before the remainder of the unsupported portion. The reason for this is that there is no feature that will pull the free edge of the unsupported portion off the transfer roller. To overcome this, supports can be positioned below the ends of the free edge or at selected points along the free edge such that the contact between the supports and the free edge is sufficient to pull the unsupported portion off the transfer roller. The second obstacle is that even when the free edge is the last part of the unsupported portion to be transferred or when there is no free edge, the shelf portion does not have enough structural integrity to withstand the tension forces between the adhered portion of the layer and the sections of the unsupported portion still on the transfer roller and as a result, the unsupported portion of layer 28 does not transfer but instead remains adhered to belt 14 creating a break in the layer. In accordance with a first embodiment, this second obstacle is overcome by pre-fusing partially-unsupported layer 28 before attempting the transfer. FIG. 3 provides a flow diagram of a method of performing such pre-fusing of partially-unsupported layers.

In step 300, the next layer to be transferred to the previously built layers is conveyed on belt 14 toward previously built part 22. At step 302, controller 24 determines whether the next layer being conveyed is a partially-unsupported layer and therefore contains an unsupported portion. If the next layer is not a partially-unsupported layer, the next layer is not heated to a fusing temperature so that it does not fuse while being conveyed on belt 14 at step 304. If the next layer is a partially-unsupported layer at step 302, the next layer is heated at step 306 so that the layer fuses while on conveyer 14 before reaching transfer roller 120.

In accordance with one embodiment, the heating of the partially-unsupported next layer is performed using selective fusing heater 90. In accordance with one embodiment, selective fusing heater 90 heats the entirety of partially-unsupported layer 28. In such embodiments, selective fusing heater 90 can take the form of non-contact radiant heaters such as infrared heaters or microwave heaters, convection heating devices (e.g., heated air blowers), contact heating devices (e.g., heated rollers and/or platens), combinations therefore, and the like, where non-contact radiant heaters are preferred. Alternatively, selective fusing heater 90 can take the form of one or more lasers that only heat the unsupported portions of partially-unsupported layer 28 to the fusing temperature. In such embodiments, the lasers of selective fusing heater 90 apply laser light only to the unsupported portions of partially-unsupported layer 28 to raise the temperature of the unsupported portions to the fusing temperature thereby causing the unsupported portions to fuse together. The remaining portions of partially-unsupported layer 28 are not heated to the fusing temperature in such embodiments.

In other embodiments, the fusing performed in step 306 of FIG. 3 involves sintering the next layer. In accordance with one embodiment, such sintering is achieved by adding a planishing roller to belt-to-part transfer assembly 33.

Figure 10:
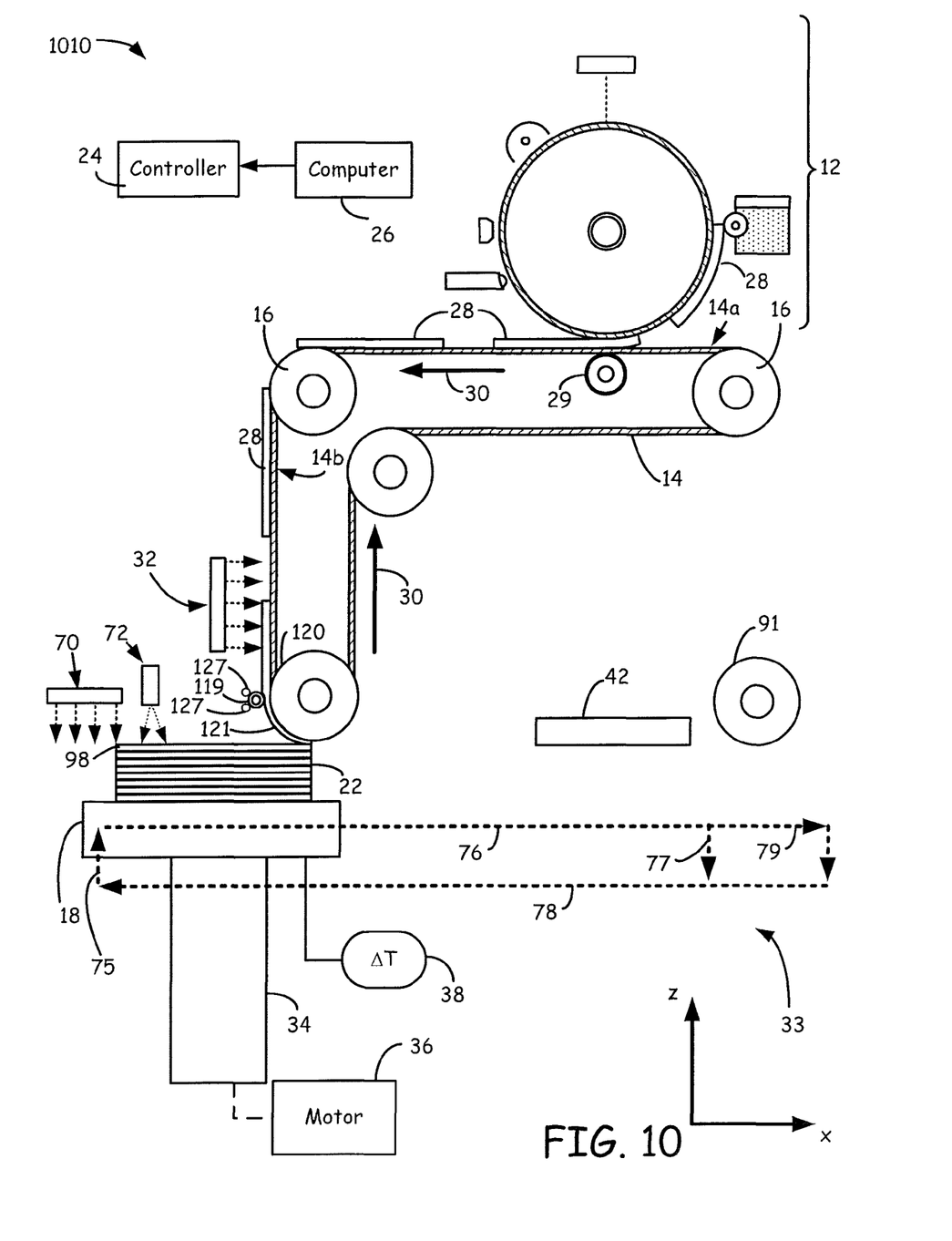
FIG. 10 is a schematic diagram of a selective deposition-based additive manufacturing system in accordance with a second embodiment.

FIG. 10 provides an example embodiment of an additive manufacturing system 1010 that includes a planishing roller 119 in belt-to-part transfer assembly 33. System 1010 is similar to system 10 described above with the exception of the addition of planishing roller 119.

In system 1010, planishing roller 119 is positioned at transfer roller 120 after layer transfer heater 32. In FIG. 10, layer transfer heater 32 heats layer 28 before it reaches planishing roller 119 and transfer roller 120. Partially-unsupported layers desirably pass by (or through) heater 32 for a sufficient residence time to heat the partially-unsupported layer to as high a temperature as possible without reaching a temperature at which partially-unsupported layer 28 begins to form beads or a temperature at which belt 14 is damaged. The formation of beads and damage to belt 14 takes time. The temperature is selected so that the time to form beads or damage the belt at that temperature is more than the time required for the layer to reach planishing roller 119 where it can be cooled during sintering. Under most embodiments, the target temperature for partially-unsupported layer 28 immediately after heater 32 is designed to degas partially-unsupported layer 28 by removing water and solvents from the layer and to promote sintering by planishing roller 119 as layer 28 moves between planishing roller 119 and transfer roller 120. For example, in one embodiment, the target temperature for partially-unsupported layer 28 is on the order of 175-200 degrees Celsius.

In one embodiment, planishing roller 119 can be a polished steel tube is pressed against transfer roller 120 by spring loaded roller bearings 127. In accordance with one embodiment, the spring loading applies a pressure of 0.048 psi-150 psi between planishing roller 119 and transfer roller 120. In accordance with one embodiment, planishing roller 119 is a hollow tube made of 52100 Alloy Steel and has a diameter of 1½ inches. However, the present disclosure is not limited to a planishing roller made of a particular material or a particular biasing mechanism.

In some embodiments that use a hollow tube for planishing roller 119, a coolant such as compressed air, Freon or water, is pumped through the center of planishing roller 119 to cool planishing roller 119. In embodiments where such coolants are used, rotary couplings are placed at the ends of planishing roller 119 to couple planishing roller 119 to pipes that supply the coolant to one end of planishing roller 119 and remove the coolant from the other end of planishing roller 119. In one such embodiment, the coolant is used to maintain planishing roller 119 at a lower temperature than transfer roller 120. For example, planishing roller 119 can be maintained at around 50 degrees Celsius while transfer roller 120 is maintained at around 140 degrees Celsius.

As heated layer 28 moves between planishing roller 119 and transfer roller 120, it is compacted to produce a sintered layer 121 that has less porosity than heated layer 28 and therefore contains less gas than heated layer 28. By removing such gas at planishing roller 119, adhesion between sintered layer 121 and part 22 is improved at the transfer point between transfer roller 120 and part 22 because less void reduction has to occur between transfer roller 120 and part 22. The resulting transferred layer supports tensile loading in which perimeters of un-supported portions of the transferred layer bond to the part sufficiently to peel the transferred layer from belt 14 using the tensile strength of the transferred layer. In addition to compacting heated layer 28, planishing roller 119 cools heated layer 28 such that sintered layer 121 is at a lower transfer temperature than the higher sintering temperature of heated layer 28.

Figure 11:
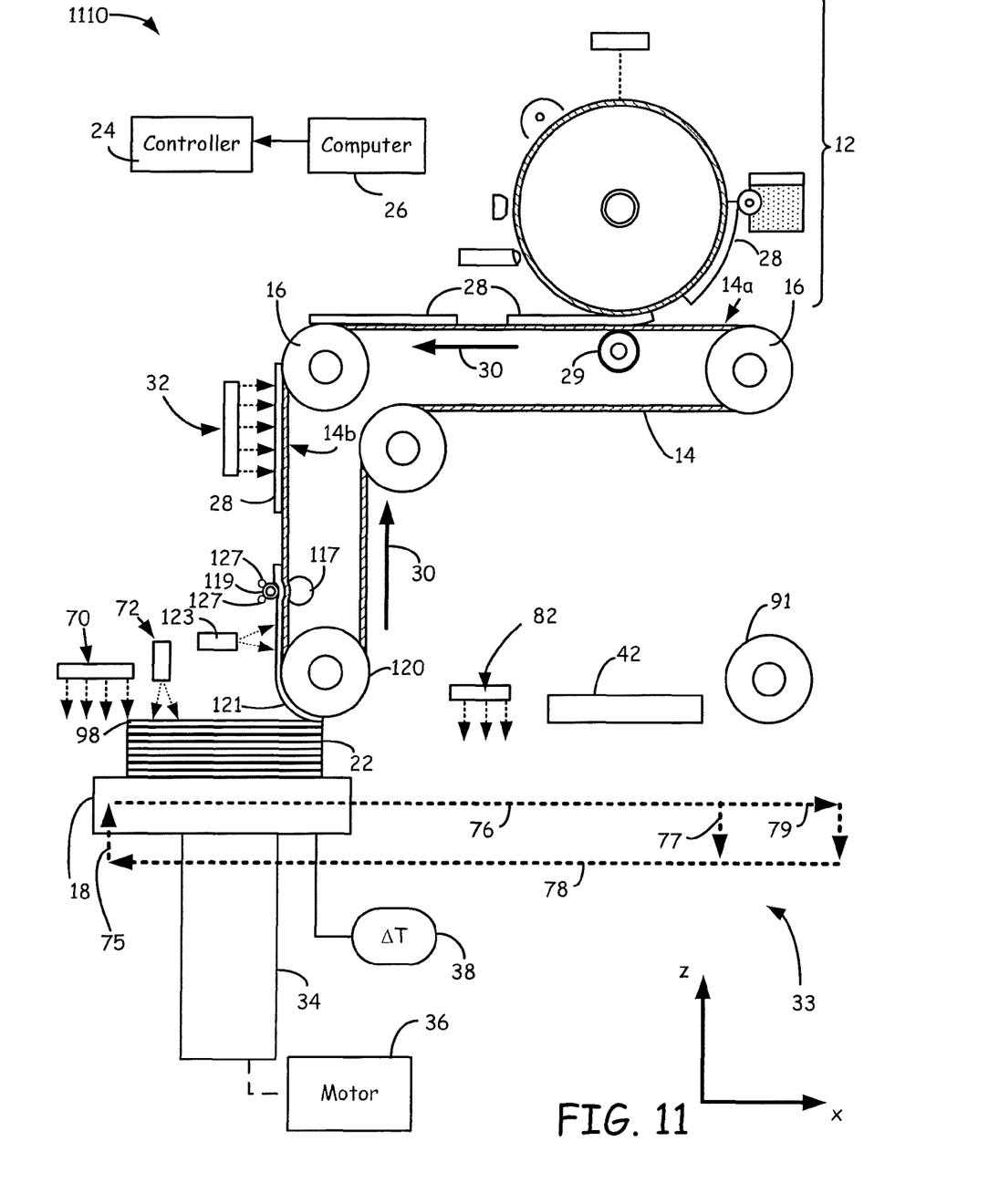
FIG. 11 is a schematic diagram of a selective deposition-based additive manufacturing system in accordance with a third embodiment.

FIG. 11 provides a schematic diagram of an exemplary selective deposition-based additive manufacturing system 1110 for printing 3D parts and support structures in accordance with a second embodiment.

System 1110 is identical to system 1010 described above with the exceptions that planishing roller 119 has been moved upward and presses against a soft roller 117 instead of against transfer roller 120 and that an optional selective heating head 123 has been added between planishing roller 119 and transfer roller 120 as part of belt-to-part transfer assembly 33. In system 1100, the roller bearings 127 pressing on planishing roller 119 are spring loaded so that planishing roller 119 is pressed against soft roller 117. In accordance with one embodiment, the spring loading applies a pressure of 0.048 psi-150 psi between planishing roller 119 and soft roller 117.

As heated layer 28 moves between planishing roller 119 and soft roller 117, it is compacted to produce sintered layer 121 that has less porosity than heated layer 28 and therefore contains less gas than heated layer 28. By removing such gas at planishing roller 119, adhesion between sintered layer 121 and part 22 is improved at the transfer point between transfer roller 120 and part 22 because less void reduction has to occur between transfer roller 120 and part 22. The resulting transferred layer supports tensile loading in which perimeters of un-supported portions of the transferred layer bond to the part sufficiently to peel the transferred layer from belt 14 using the tensile strength of the transferred layer. In addition to compacting heated layer 28, planishing roller 119 cools heated layer 28 such that when sintered layer 121 exits planishing roller 119, it is at a lower temperature than the higher sintering temperature of heated layer 28.

In accordance with one embodiment, soft roller 117 consists of an outer layer of silicone rubber around a metal axel. The force between planishing roller 119 and soft roller 117 causes the outer silicone rubber layer to depress as layer 28 is sintered between planishing roller 119 and soft roller 117.

Optional selective heating head 123 selectively heats portions of sintered layer 121 in embodiments where planishing roller 119 cools sintered layer 121 below a transfer temperature. By cooling sintered layer 121 below the transfer temperature and only reheating selective portions of sintered layer 121, it is possible to increase part stability for some portions of sintered layer 121 that would otherwise become too hot during the transfer to part 22. Selective heating head 123 may take the form of a laser, an array of lasers or other mechanism capable of delivering heat to part of a layer without heating other parts of the layer. In particular, selective heading head 123 can heat supported portions of the partially-unsupported layer while not heating the unsupported portions.

Figure 4:
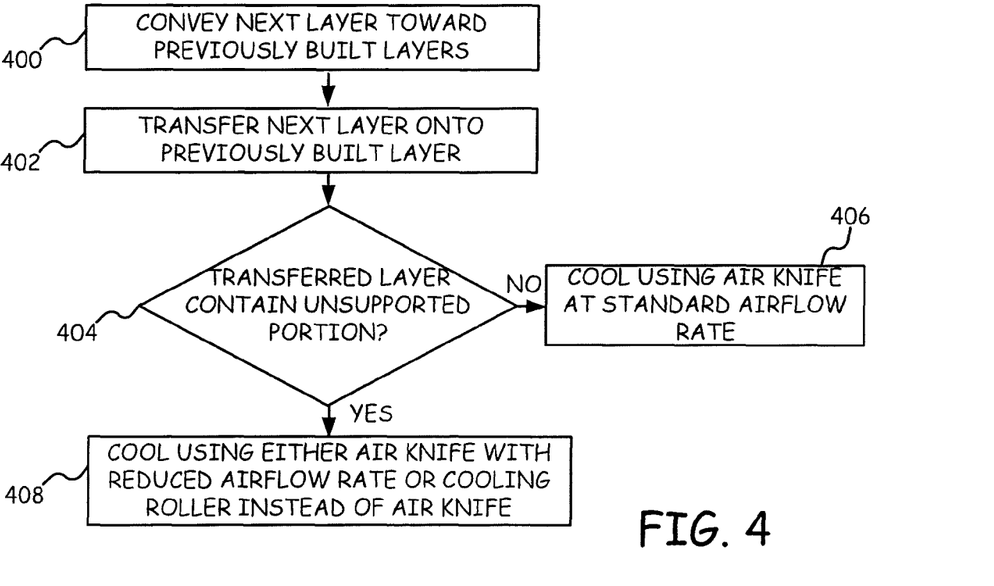
FIG. 4 is a flow diagram of method of a second embodiment for forming a shelf using additive manufacturing.

As discussed above, another cause of failure in additive manufacturing is the disfiguring of unsupported portions by air knife 42 as the newly transferred unsupported portion moves past air knife 42. In particular, because there is a space underneath the unsupported portion, the air flow from air knife 42 causes the unsupported portion to move vertically. FIG. 4 provides a method for overcoming this problem.

In step 400 of FIG. 4, a next layer 28 is conveyed by belt 14 toward part 22 containing previously built layers. At step 402, the conveyed next layer is transferred onto the previously built layers. At step 404, controller 24 determines if the transferred layer contains an unsupported portion. If the transferred layer does not contain an unsupported portion, the transferred layer and part 22 are cooled at step 406 using air knife 42 at its standard airflow rate. If the transferred layer contains an unsupported portion at step 404, the transferred layer is cooled at step 408 using an alternative cooling method. In one embodiment, the alternative cooling method is to lower the airflow of the air knife. In other embodiments, the alternative cooling method is to turn off the airflow of air knife 42 completely and move gantry 34 along extended path 79 so that the transferred layer comes into contact with cooling roller 91 or passes through an air tunnel. Cooler roller 91 contacts the transferred layer and absorbs heat from the transferred layer to cool the transferred layer and part 22. By using a reduced airflow or by reducing the airflow to zero and using cooling roller 91 or an air tunnel instead of the standard airflow rate to cool the transferred layer, the embodiment of FIG. 4 reduces or eliminates the possibility that the unsupported portion will be distorted by the airflow of air knife 42.

Figure 5:
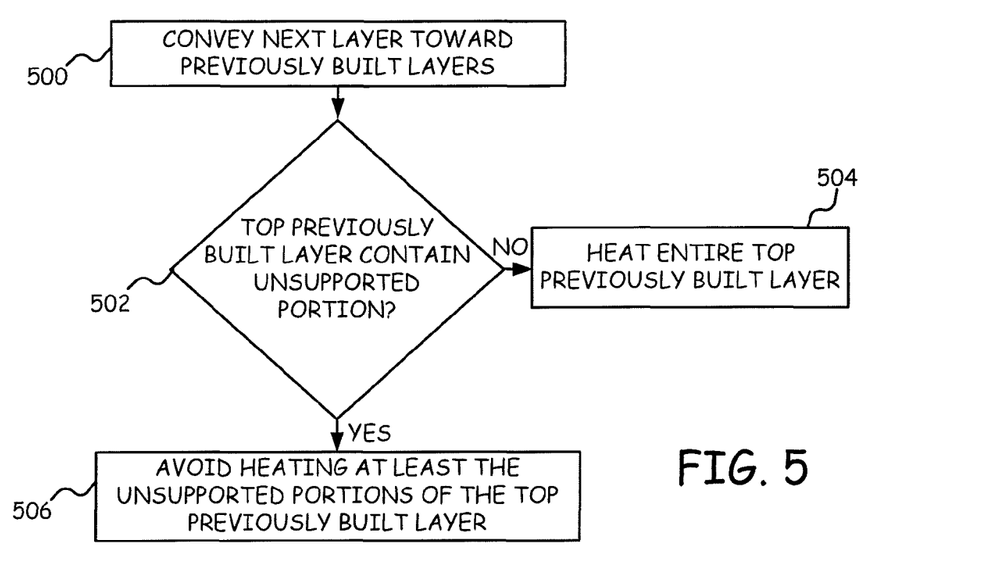
FIG. 5 is a flow diagram of a method of a third embodiment for forming a shelf using additive manufacturing.

Another cause of build failure discovered by the present inventors is the excessive heating of unsupported portions due to increased thermal resistance of the spaces below the unsupported portions. This excessive heating is caused by uniform part transfer heater 70 when heating the top layer of part 22 to assist in the transfer of layer 28. FIG. 5 provides a method for overcoming this excessive heating of previously transferred unsupported portions.

At step 500, a next layer 28 is conveyed towards previously built layer 98 of part 22. At step 502, controller 24 determines if previously built layer 98 contains an unsupported portion. If previously built layer 98 does not contain an unsupported portion, the entire top of previously built layer 98 is heated by uniform part transfer heater 70 at step 504. If previously built layer 98 contains an unsupported portion, controller 24 avoids heating at least the unsupported portion of previously built layer 98 at step 506.

In accordance with one embodiment, controller 24 avoids heating at least the unsupported portions of the top previously built layer 98 by turning off uniform part transfer heater 70 and not applying any heat to top previously built layer 98 before transferring next layer 28 on top of top previously built layer 98. Alternatively, controller 24 heats some parts of top previously built layer 98 but avoids heating the unsupported portions using selective part transfer heater 72. In accordance with one embodiment, selective part transfer heater 72 is a laser or laser array that is capable of applying heat only to those portions of top previously built layer 98 that do not contain an unsupported portion. By not heating the unsupported portions of the top previously built layer 98, the unsupported portions do not receive excessive heat and therefore do not heat to the point of mechanical failure.

While a laser is disclosed for selective part transfer heater 72 and selective fusing heater 90, the embodiments are not limited to a laser for these heaters and any mechanism capable of delivering heat to part of a layer without heating other parts of the layer may be used in place of the laser.

Each of the methods shown in FIGS. 3, 4 and 5 may be practiced alone or in combination with one or more of the other methods. In each of the methods of FIGS. 3, 4 and 5 the controller determines if one of either the layer being conveyed or the previously transferred layer contains an unsupported portion. When one of those layers contains an unsupported portion, a first set of steps are performed to transfer a conveyed layer onto previously built layers. When neither of those layers contains an unsupported portion, a second set of steps, different from the first set of steps, is used to transfer a conveyed layer onto previously built layers. In particular, in each method, the heating or cooling of one of the layers is altered when one of the two layers contains an unsupported portion.

In yet a further embodiment, shelves are formed by altering the printing of a layer and altering the transfer of that layer so that a shelf is formed from the layer.

Figure 6:
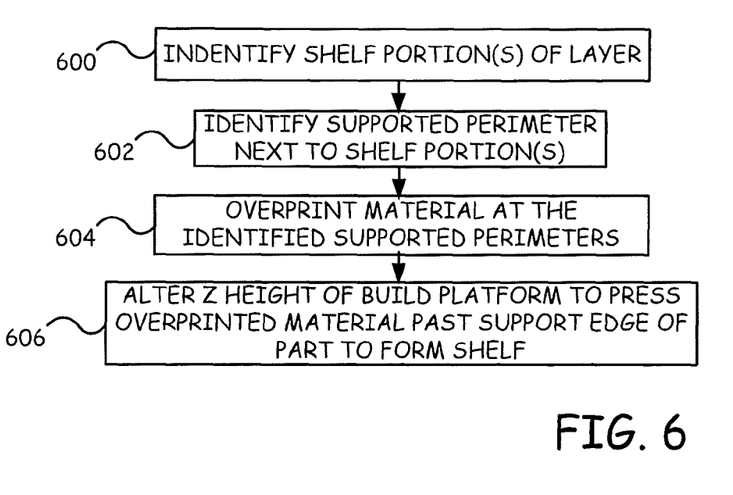
FIG. 6 is a flow diagram of a method of a fourth embodiment for forming a shelf in additive manufacturing.

FIG. 6 provides a flow diagram of a method of altering the printing and transferring of the layer to form a shelf.

In step 600 of FIG. 6, shelf portions for a layer are identified by control 24. Such shelf portions will extend over a space next to a previously built layer and will have a free edge that is not supported. At step 604, controller 24 identifies a supported perimeter next to the shelf portion. The supported perimeter is an area of the layer that will be transferred on to an existing previously built portion of the part and is next the location where the shelf is desired. At step 604, the print engine 12 over prints material at the identified supported perimeter. This overprinting of material results in a material thickness that is greater at the identified supported perimeter than in other portions of the layer.

Figure 7:
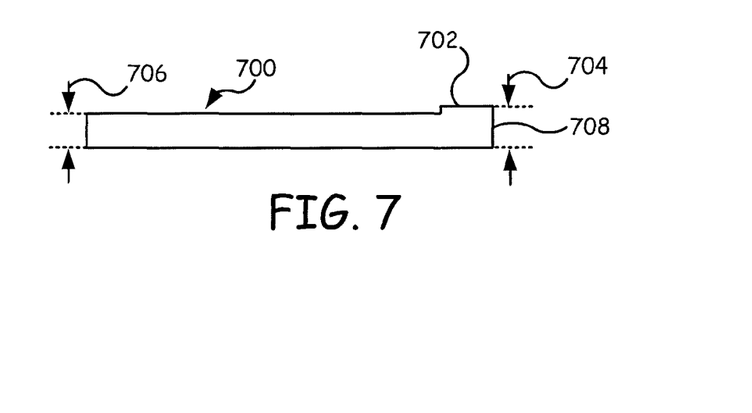
FIG. 7 provides a side view of a layer with an overprinted edge.
Figure 8:
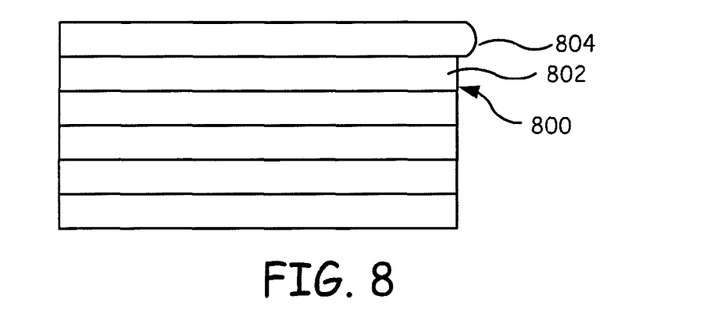
FIG. 8 provides a side view of a part after the layer of FIG. 7 has been transferred onto a part.

FIG. 7 provides an example of a printed layer 700 that includes a supported perimeter 702 having a thickness 704 that is greater than a thickness 706 of the remaining portions of layer 700. Identified supported perimeter 702 has an edge 708 that is to align with an edge 800 of a previously built layer 802 shown in FIG. 8.

The overprinted material can include only part material or a combination of part material and support material. In a further embodiment, the luminance applied to the photoconductor is controlled to attract additional toner to supported perimeter 702 to thereby form the greater thickness 704. Further, since toner particles are charged, there is a tendency for space charges that naturally create edge enhancement. This tendency can be selectively enabled for self-edge thickening.

Figure 9:
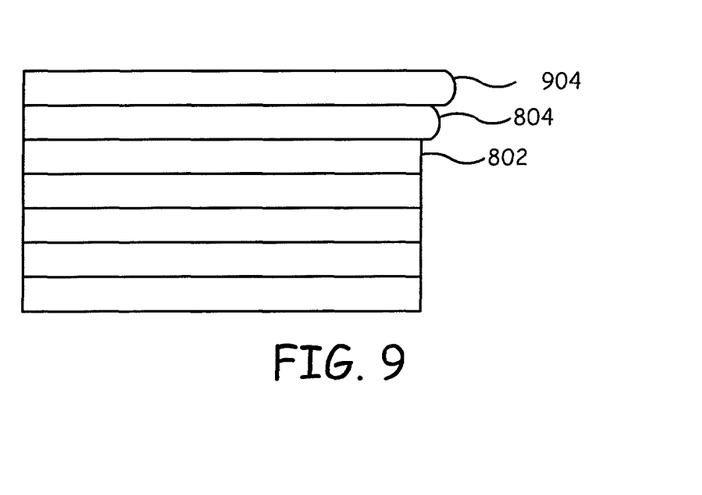
FIG. 9 provides a side view of the part of FIG. 8 after an additional layer with an overprinted edge has been transferred onto the part showing a progressive shelf.

At step 606, gantry 34 alters the height of build platform 18 to press the overprinted material, such as overprinted material 702, past the support edge 800 of layer 802 to form shelf 804. The process of FIG. 6 can be repeated for the next layer to form progressive shelf 904 on top of shelf 804 as shown in FIG. 9. Shelf 904 extends out further into the space past edge 800 than shelf 804. Such progressive shelves can be used to form shapes such as triangular groin vaults and can convert otherwise solid support blocks into mostly air.

Importantly being able to print one material with voids allows a second material to be utilized to form a 3D part through additive material that is susceptible to deformation to be utilized, where the material flows to fill the voids created through the electrostatographic additive manufacturing process. As such, utilizing the disclosed techniques, parts can be printed of materials that typically could not be accomplished utilizing electrostatography additive manufacturing.

Although the present disclosure has been described with reference to preferred embodiments, workers skilled in the art will recognize that changes may be made in form and detail without departing from the spirit and scope of the disclosure.

The invention claimed is:

1. A method of additive manufacturing utilizing a selective deposition-based process, the method comprising:
    conveying a layer of material to previously built layers of material;
    determining whether at least one of the conveyed layer of material and a top previously built layer of material contains an unsupported portion;
    when at least one of the conveyed layer of material and the top previously built layer of material contains an unsupported portion, using a first set of steps to transfer the conveyed layer of material to the top previously built layer of material, the first set of steps comprising heating at least a portion of the conveyed layer of material to fuse the portion as the conveyed layer of material is conveyed to the previously built layers; and when neither of the conveyed layer of material and the top previously built layer of material contains an unsupported portion, using a second set of steps to transfer the conveyed layer of material to the top previously built layer of material, wherein the second set of steps lack the step of heating at least a portion of the conveyed layer to fuse the portion.

2. The method of claim 1 wherein heating at least the portion of the conveyed layer of material to fuse the portion comprises heating an unsupported portion.

3. The method of claim 2 wherein heating the unsupported portion comprises using a laser to heat the unsupported portion.

4. The method of claim 1 wherein the second set of steps comprises heating an entire surface of the top previously built layer of material before transferring the conveyed layer to the top previously built layer and the first set of steps comprises not heating at least a portion of the top previously built layer of material before transferring the conveyed layer to the top previously built layer.

5. The method of claim 4 wherein not heating at least a portion of the top previously built layer of material comprises using a laser to heat a portion of the top previously built layer without heating an unsupported portion of the top previously built layer.

6. The method of claim 1 wherein the second set of steps comprises after transferring the conveyed layer to the top previously built layer, applying a first air flow across the transferred layer and the first set of steps comprises after transferring the conveyed layer to the top previously built layer applying a second air flow across the transferred layer, an air flow rate of the second air flow being less than an air flow rate of the first air flow.

7. The method of claim 1 wherein the conveyed layer of material comprises a first portion with a first thickness and a second portion with a second thickness greater than the first thickness and the first set of steps comprises pressing the second portion with the second thickness during transfer of the conveyed layer of material onto the top previously built layer so that material extends over an edge of the top previously built layer to thereby form a shelf in the conveyed layer and the second set of steps does not press the conveyed layer so that material extends over an edge of the top previously built layer.

8. The method of claim 7 wherein the second portion with the second thickness comprises a combination of part material and support material.

9. The method of claim 8 wherein the second portion with the second thickness comprises more part material than the first portion with the first thickness.

10. The method of claim 1 wherein the first set of steps comprise sintering the conveyed layer before transferring the conveyed layer onto the top previously built layer.

11. The method of claim 10 wherein sintering the conveyed layer comprises pressing the conveyed layer using a planishing roller.

12. The method of claim 10 wherein the sintered layer is cooled before transferring the conveyed layer onto the top previously built layer.

* * * * *